Patented Aug. 11, 1925.

1,549,398

UNITED STATES PATENT OFFICE.

JAMES A. WHITTINGTON, OF CHICAGO, ILLINOIS.

PRODUCING ALUMINUM COMPOUNDS.

No Drawing.  Application filed September 15, 1922. Serial No. 588,487.

*To all whom it may concern:*

Be it known that I, JAMES A. WHITTINGTON, a citizen of the United States, residing at Chicago, in the county of Cook and State of Illinois, have invented new and useful Improvements in Producing Aluminum Compounds, of which the following is a specification.

The present invention relates to improvements in processes for breaking down or decomposing of aluminum containing materials of the character of bauxite, clay, feldspar, and the like, and to the utilization of the aluminum and will be fully understood from the following description of the process.

In accordance with the present invention, the aluminum containing material, which may be a bauxite, clay, kaolin, feldspar, or the like, is thoroughly mixed with ammonium sulfate, the latter being preferably present in amounts somewhat in excess of that required for the conversion of the aluminum, potassium and iron present in the material to the sulfate. An excess of about 10% is in general sufficient. With kaolin, the amount of ammonium sulfate required is about 1¾ times by weight the amount of the kaolin.

The mixture of clay or other aluminum containing material and ammonium sulfate is next heated in a suitable furnace, reaction beginning, as indicated by evolution of ammonia, in the neighborhood of 300° C. The mixture is heated above this temperature until reaction is completed, as indicated by the cessation of the evolution of ammonia gas. The reaction results in the formation of aluminum sulfate, iron sulfate, and potassium sulfate if iron and potassium compounds are present in the clay or other aluminum containing material undergoing treatment. When iron is present, the temperature of reaction is preferably carried to a temperature of 525 to 560° C., at which temperature the iron sulfate formed is converted into insoluble oxides, which may be conveniently separated from the aluminum sulfate in the later stages of the process.

After reaction is completed, the furnace is discharged into a suitable tank and the mixture is digested or lixiviated with hot water and filtered. The aluminum of the aluminum material is contained in the filtrate as aluminum sulfate, together with any potassium sulfate that may have been produced. The iron, if originally present, has been converted, during the heating, to iron oxide, and remains in the residue with the silica. The aluminum sulfate may be recovered from the solution by crystallization, if desired. It is preferred, however, to precipitate the aluminum as aluminum hydroxide, this being suitably effected by passing therethrough ammonia gas given out during the reaction of ammonium sulfate upon a fresh stock of the aluminum silicate material. The precipitated aluminum hydroxide is removed by filtration, the ammonium sulfate in the filtrate being recovered in any suitable manner. For example, the filtrate may be evaporated to dryness and the ammonium sulfate separated from any potassium sulfate which may be present (since the potassium sulfate remains in solution with the ammonium sulfate in the said filtrate) by volatilization.

The precipitated aluminum hydroxide is dissolved in hydrochloric acid, just sufficient being employed to make a neutral solution. The solution is evaporated to dryness, aluminum chloride being thereby obtained. The aluminum chloride is then thoroughly mixed with calcium sulfide in amount sufficient to completely react with the formation of aluminum sulfide. The mixture is then heated or warmed to a temperature not exceeding 100° C. and preferably about 60 to 80° C. At this temperature a substantially quantitative reaction takes place with the formation of aluminum sulfide and calcium chloride. The calcium chloride may be removed by lixiviation with hot alcohol, the solvent being recovered and reused in treating succeeding batches. The aluminum sulfide thus produced may be used in the electric furnace for the production of aluminum, or may be otherwise employed. The calcium chloride may be reconverted to calcium sulfide by reaction with barium sulfide or by other suitable means.

In place of calcium sulfide, other alkaline or alkaline earth metal sulfides (hereinafter designated sulfides of alkali forming metals) may be employed for reaction with the aluminum chloride. Thus sulfides of strontium, barium, lithium, sodium, potassium, manganese or magnesium will effect this conversion. The use of calcium sulfide is preferred, however, by reason of the greater ease and completeness of reaction, its lower cost and the greater ease of separation of the resulting products.

I claim:

1. The method of forming aluminum sulfide consisting in heating aluminum chloride with a sulfide of an alkali-forming metal at a temperature not over 100° C., and separating the resulting aluminum sulfide.

2. The method of forming aluminum sulfide consisting in heating hydrated aluminum chloride with a sulfide of an alkali forming metal at a temperature not over 100° C., and separating the resulting aluminum sulfide.

3. The method of forming aluminum sulfide which consists in heating aluminum chloride with the sulfide of an alkali forming metal at a temperature not over 100° C.

4. The method of forming aluminum sulfide which consists in heating aluminum chloride with calcium sulfide at a temperature not over 100° C.

JAMES A. WHITTINGTON.